(12) United States Patent
Manolescu

(10) Patent No.: US 11,473,343 B2
(45) Date of Patent: Oct. 18, 2022

(54) ACTUATOR ASSEMBLY FOR A VEHICLE DOOR HAVING A CLIP-ON WIPER FOR PREVENTING INFILTRATION OF FOREIGN MATERTAL INTO THE CABLE HOUSING

(71) Applicant: Ford Global Technologies, LLC, Dearborn, MI (US)

(72) Inventor: Constantin Manolescu, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 16/354,979

(22) Filed: Mar. 15, 2019

(65) Prior Publication Data
US 2020/0291692 A1    Sep. 17, 2020

(51) Int. Cl.
  E05B 77/34      (2014.01)
  E05B 79/20      (2014.01)
  F16C 1/10       (2006.01)

(52) U.S. Cl.
  CPC .............. *E05B 77/34* (2013.01); *E05B 79/20* (2013.01); *F16C 1/107* (2013.01)

(58) Field of Classification Search
  CPC ...... E05B 79/20; E05B 53/003; E05B 53/005; E05B 79/12; E05B 79/18; E05B 77/34; Y10S 292/53; F16C 1/107
  See application file for complete search history.

(56) References Cited

U.S. PATENT DOCUMENTS

| | | | |
|---|---|---|---|
| 4,534,239 A | 8/1985 | Heimann | |
| 5,809,840 A | 9/1998 | Oda et al. | |
| 8,919,707 B2 * | 12/2014 | Lee | H02G 3/30 248/74.1 |
| 9,291,096 B2 * | 3/2016 | Kobayashi | F16C 1/226 |
| 2008/0047112 A1 * | 2/2008 | Hoekstra | E05B 79/20 24/457 |
| 2014/0232122 A1 * | 8/2014 | Schnetter | E05B 77/06 292/336.3 |
| 2017/0122363 A1 * | 5/2017 | Kim | F16C 1/106 |
| 2018/0105404 A1 | 4/2018 | Hall et al. | |
| 2021/0079695 A1 * | 3/2021 | Nagaoka | E05B 79/20 |

FOREIGN PATENT DOCUMENTS

| | | | | |
|---|---|---|---|---|
| DE | 19755592 A1 * | 6/1999 | ......... | B60R 13/0206 |
| EP | 1752229 | 2/2007 | | |
| EP | 2848511 A1 * | 3/2015 | ............. | F16C 1/105 |

(Continued)

*Primary Examiner* — Kristina R Fulton
*Assistant Examiner* — Noah Horowitz
(74) *Attorney, Agent, or Firm* — Vichit Chea; Price Heneveld LLP

(57) ABSTRACT

A vehicle door includes an actuator for operating a latching mechanism. An actuator cable extends between the actuator and the latching mechanism. A cable housing slidably receives the actuator cable. The actuator cable is operable within the cable housing between extended and retracted positions. A cable bracket secures the cable housing to a frame member in a secured position. A clip assembly attaches to the cable housing and slidably engages the actuator cable upon operation of the actuator. The clip assembly engages the cable housing at a first side of the cable bracket and engages the actuator cable at a second side of the cable bracket.

13 Claims, 9 Drawing Sheets

(56) References Cited

FOREIGN PATENT DOCUMENTS

| ES | 2302160 T3 * | 7/2008 | ............. F16C 1/262 |
|----|---|---|---|
| GB | 2081411 | 2/1982 | |
| JP | 1169571 | 3/1999 | |
| KR | 19990025778 | 7/1999 | |
| WO | WO-02055818 A1 * | 7/2002 | ............. F16C 1/262 |

* cited by examiner

ACTUATOR ASSEMBLY FOR A VEHICLE DOOR HAVING A CLIP-ON WIPER FOR PREVENTING INFILTRATION OF FOREIGN MATERTAL INTO THE CABLE HOUSING

FIELD OF THE INVENTION

The present invention generally relates to vehicle doors, and more specifically, a clip-on wiper that is attached to a cable housing and continually cleans the cable actuator for preventing infiltration of foreign material.

BACKGROUND OF THE INVENTION

Within various vehicles, vehicle doors include latching mechanisms that have operating mechanisms that are accessible from the interior and exterior of the vehicle door. These operating mechanisms are typically cable-operated. Manipulation of a handle creates movement within an actuator cable for modifying a state of the latching mechanism. Through these movements, the interior and exterior handles of the door can be used to latch, unlatch or lock the latching mechanism in a particular position.

SUMMARY OF THE INVENTION

According to one aspect of the present invention, an actuator assembly for a vehicle door includes an actuator operably engaged with an actuator cable. A cable housing receives the actuator cable. A cable bracket secures the cable housing in a secured position. A clip assembly attaches to the cable housing and also slidably engages the actuator cable upon operation of the actuator.

Embodiments of this aspect of the invention can include any one or combination of the following features:
  the clip assembly attaches to the cable housing proximate a first side of the cable bracket and slidably engages the actuator cable proximate a second side of the cable bracket.
  the clip assembly includes a body portion that is configured to engage the cable bracket to define an attached position.
  the clip assembly includes an attaching member that extends from the body portion, the attaching member selectively attaching to the cable housing proximate the first side of the cable bracket.
  the attaching member includes resilient arms that at least partially encircles the cable housing.
  the clip assembly includes a frame portion and an elastomeric cap positioned within the frame portion.
  the frame portion selectively engages the actuator cable proximate a second side of the cable bracket.
  the elastomeric cap includes a slot that slidably engages the actuator cable during operation of the actuator and upon placement of the clip assembly in the attached position.
  the frame portion in the attached position engages an end of the cable housing.
  the body portion includes a seat member that engages with the cable housing proximate the end of the cable housing to seat that frame member and the elastomeric cap at the end of the cable housing.
  the elastomeric cap defines a cover for the end of the cable housing that is configured to prevent infiltration of foreign material into the cable housing via the actuator cable.

According to another aspect of the present invention, a vehicle door includes an actuator for operating a latching mechanism. An actuator cable extends between the actuator and the latching mechanism. A cable housing slidably receives the actuator cable. The actuator cable is operable within the cable housing between extended and retracted positions. A cable bracket secures the cable housing to a frame member in a secured position. A clip assembly attaches to the cable housing and slidably engages the actuator cable upon operation of the actuator. The clip assembly engages the cable housing at a first side of the cable bracket and engages the actuator cable at a second side of the cable bracket.

Embodiments of this aspect of the invention can include any one or combination of the following features:
  the clip assembly includes a body portion that is configured to engage the cable bracket to define an attached position.
  the clip assembly includes an attaching member and a frame portion that each extend from the body portion.
  the attaching member selectively attaches to the cable housing and the frame portion selectively engaging the actuator cable.
  the attaching member includes resilient arms that at least partially encircles the cable housing.
  the frame portion includes an elastomeric cap positioned within the frame portion that slidably engages the actuator cable.
  the elastomeric cap includes a slot that slidably engages the actuator cable during operation of the actuator and upon placement of the clip assembly in the attached position.
  the body portion includes a seat member that engages with the cable housing proximate an end of the cable housing to seat that frame portion and the elastomeric cap at the end of the cable housing.
  the elastomeric cap defines a cover for the end of the cable housing that is configured to prevent infiltration of foreign material into the cable housing via the actuator cable.

According to another aspect of the present invention, an actuator assembly for a vehicle door includes an actuator for operating a latching mechanism. An actuator cable is slidable within a cable housing and extending between the actuator and the latching mechanism. A cable bracket secures the cable housing to a frame member in a secured position. A clip assembly attaches to the cable housing and slidably engages the actuator. The clip assembly comprises a body portion that engages the cable bracket. A resilient attaching member encircles a portion of the cable housing. An elastomeric cap selectively and slidably engages the actuator cable. The resilient attaching member and the elastomeric cap extend from the body portion.

Embodiments of this aspect of the invention can include any one or combination of the following features:
  the clip assembly includes a seat member that engages with the cable housing proximate an end of the cable housing to seat the frame member and the elastomeric cap at the end of the cable housing.
  wherein the elastomeric cap defines a cover for the end of the cable housing that is configured to prevent infiltration of foreign material into the cable housing via the actuator cable.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
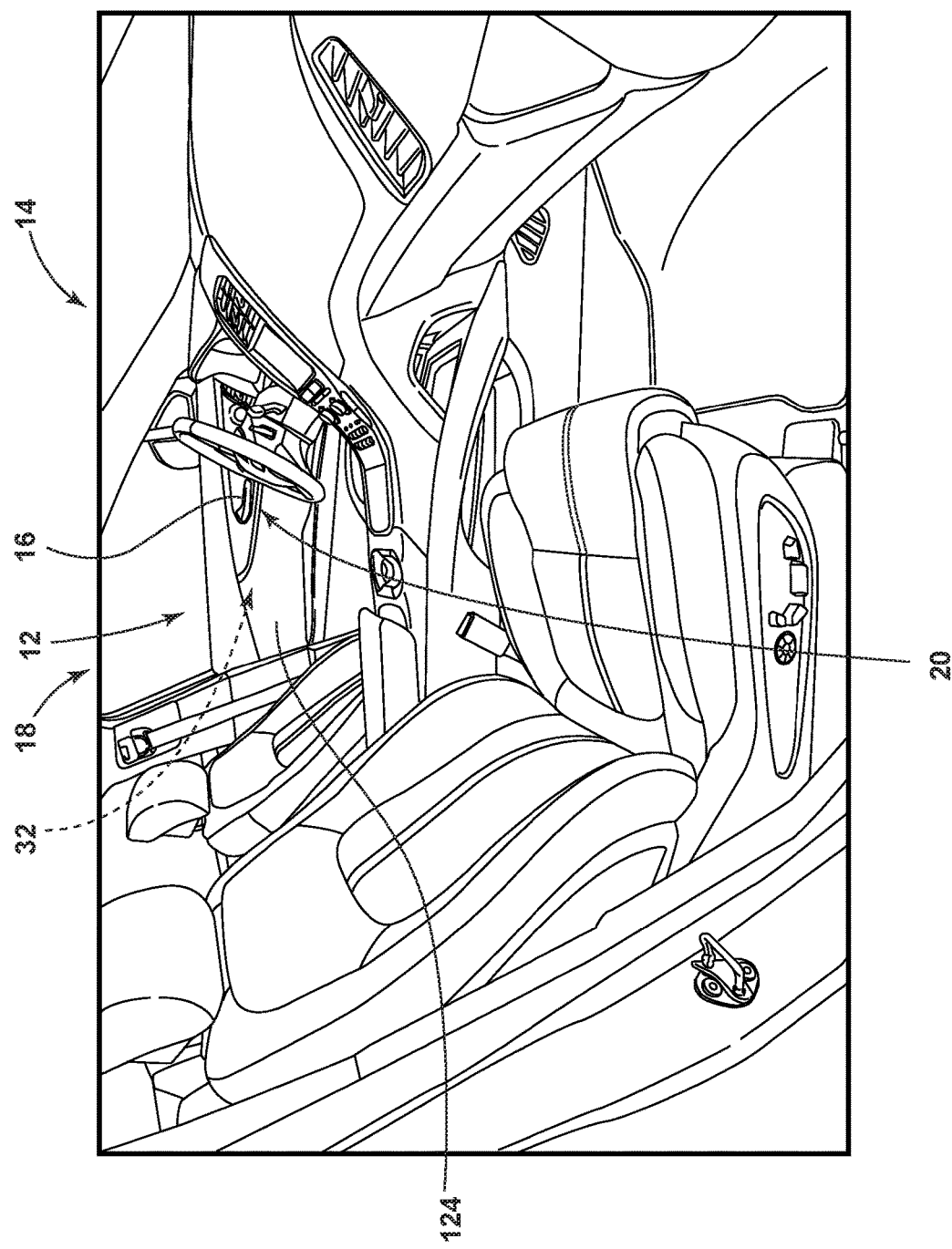
FIG. 1 is an interior perspective view of a passenger cabin for a vehicle, and showing an interior surface of a vehicle door.
Figure 2:
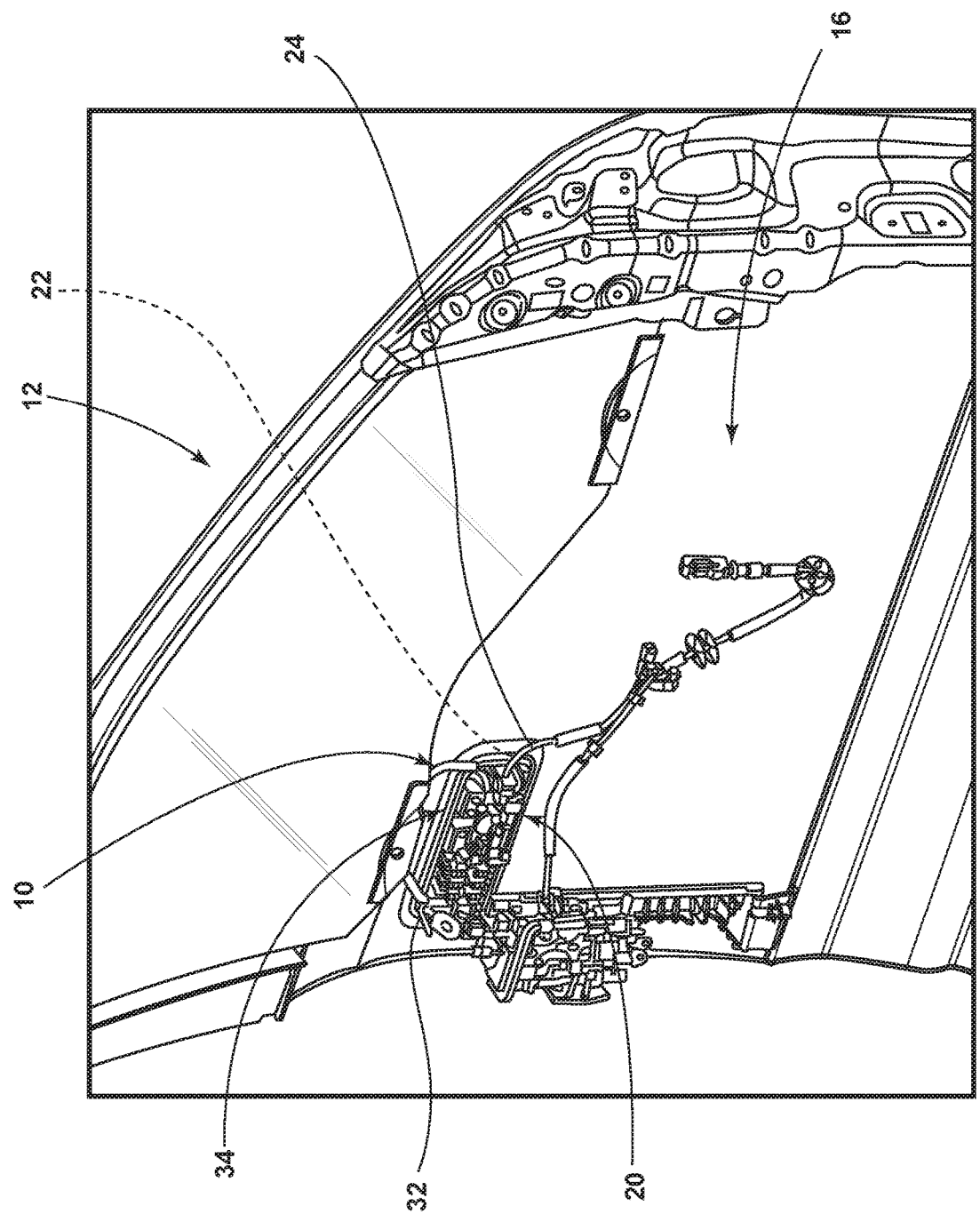
FIG. 2 is a side perspective view of an interior portion of a vehicle door with the inner trim panel removed and showing the operating mechanisms for the vehicle door.
Figure 3:
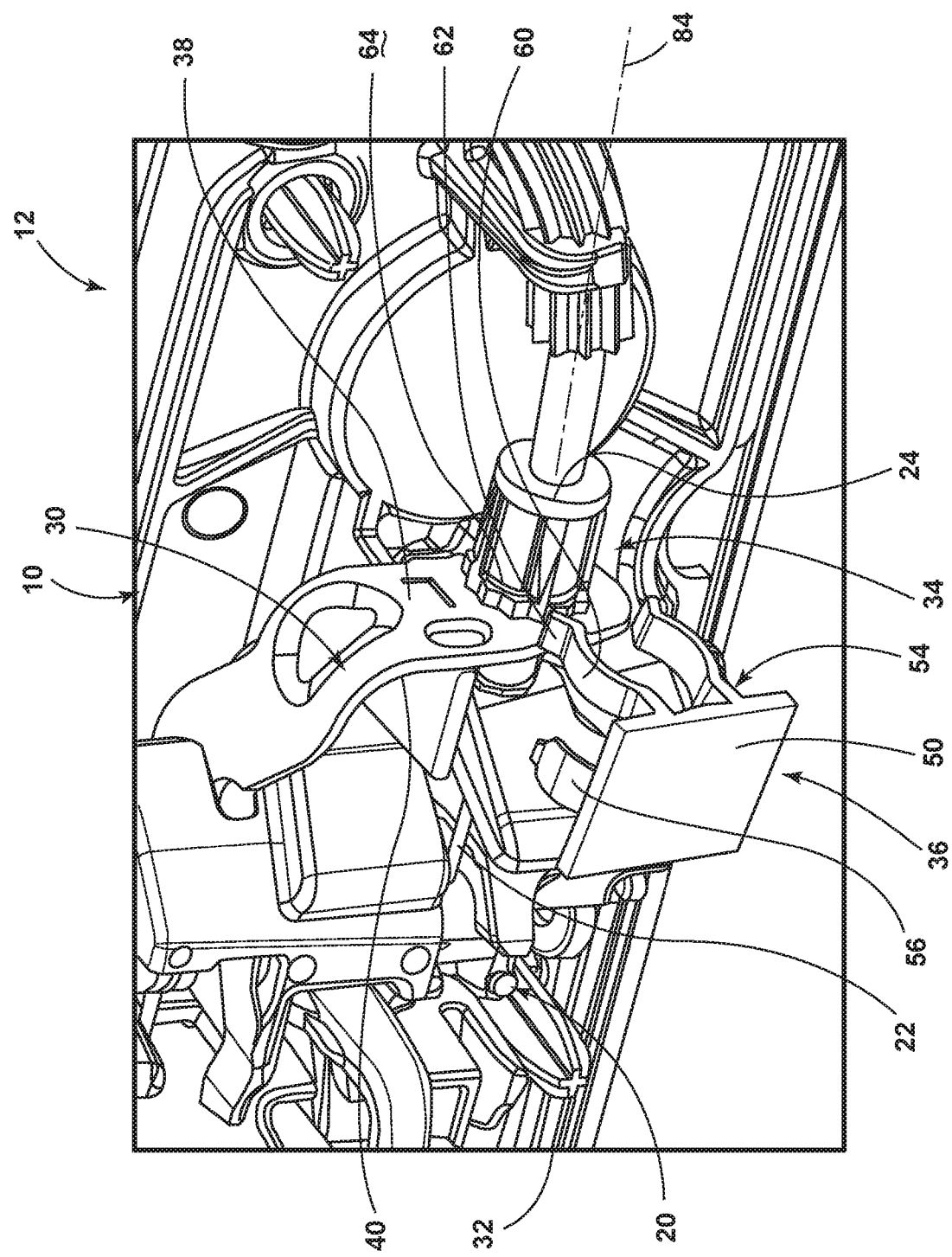
FIG. 3 is an enlarged perspective view of the actuator assembly for the vehicle door and showing the clip assembly separated from the cable housing and the actuator cable.
Figure 4:
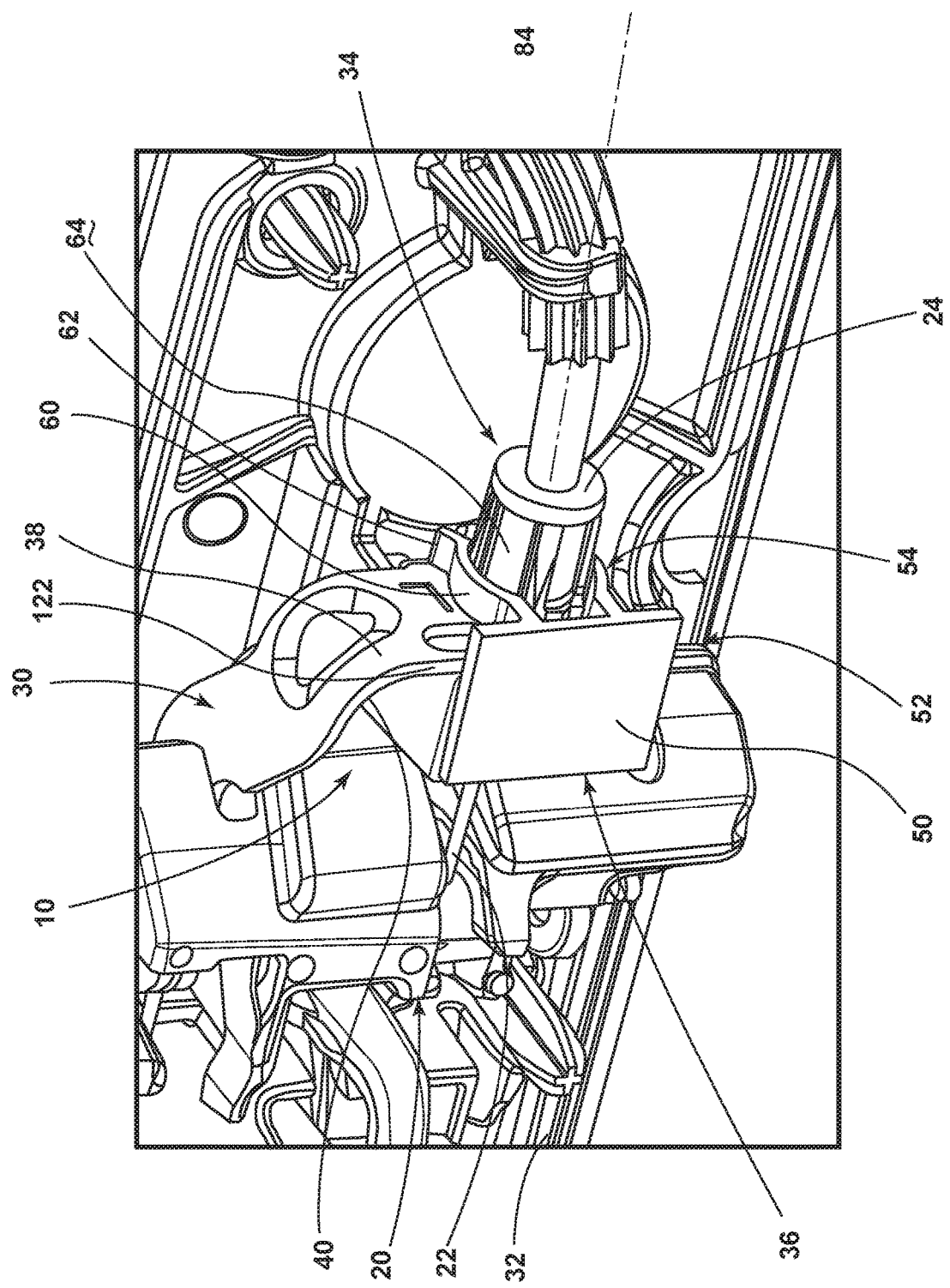
FIG. 4 is a side perspective view of the actuator assembly of FIG. 3 and showing the clip assembly coupled with the cable housing and the actuator cable.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-8, reference numeral 10 generally refers to an actuator assembly for a door 12 of a vehicle 14, where the actuator assembly 10 is used to manipulate a latching mechanism 16 for the door 12. Such a latching mechanism 16 is used for securing the door 12 within and releasing the door 12 from a closed position 18 with respect to the remainder of the vehicle 14. According to various aspects of the device, the actuator assembly 10 for the door 12 of the vehicle 14 can include an actuator 20 for operating the latching mechanism 16. An actuator cable 22 extends between the actuator 20 and the latching mechanism 16. A cable housing 24 slidably receives the actuator cable 22, where the actuator cable 22 is operable within the cable housing 24 between extended and retracted positions 26, 28. The extended and retracted positions 26, 28 of the actuator cable 22 are defined through operation of the actuator 20 for the door 12 of the vehicle 14. The actuator 20 is typically in the form of a handle, button, knob or other similar operable member. A cable bracket 30 extends from a frame member 32 of the door 12. The cable bracket 30 serves to secure the cable housing 24 to the frame member 32 to define a secured position 34 of the cable housing 24. A clip assembly 36 attaches to the cable housing 24 and also slidably attaches to the actuator cable 22. The slidable engagement between the clip assembly 36 and the actuator cable 22 can occur both upon installation of the clip assembly 36 with respect to the actuator cable 22 and also upon operation of the actuator 20.

Through this configuration, as exemplified in FIGS. 1-8, as the actuator 20 operates, the actuator cable 22 moves between the extended and retracted positions 26, 28 with respect to the cable housing 24. During this motion of the actuator cable 22, the actuator cable 22 slidably engages a portion of the clip assembly 36. The slidable engagement with the clip assembly 36 allows the clip assembly 36 to push off, wipe off, or otherwise remove fluid and debris from a temporarily exposed portion 100 of the actuator cable 22 entering into the cable housing 24. To secure the clip assembly 36 to the cable housing 24, the clip assembly 36 engages the cable housing 24 at a first side 38 of the cable bracket 30. The clip assembly 36 also engages the actuator cable 22 at a second side 40 of the cable bracket 30. In this manner, the clip assembly 36 at least partially wraps around each side of the cable bracket 30 to attach to each of the cable housing 24 and the actuator cable 22.

Referring again to FIGS. 3-8, the clip assembly 36 used in connection with the actuator assembly 10 includes a body portion 50 that is configured to engage the cable bracket 30 to define an attached position 52. Accordingly, the body portion 50 of the clip assembly 36 is typically a substantially planar member that can be sized for convenient grasping by a technician or assembly worker for attaching to the cable housing 24. An attaching member 54 and a frame portion 56 each extend from the body portion 50. The attaching member 54 selectively attaches to the cable housing 24 to secure the clip assembly 36 to the actuator assembly 10. The frame portion 56 of the clip assembly 36 selectively engages the actuator cable 22. Through this configuration, the attaching member 54 is secured to the cable housing 24. This engagement with the cable housing 24 holds the clip assembly 36 in place so that the frame portion 56 can be held to slidably engage the actuator cable 22 during operation of the actuator 20.

As exemplified in FIGS. 3-8, the clip assembly 36 is held in place at the cable housing 24 by a resilient assembly that at least partially encircles the cable housing 24. The resilient assembly can be in the form of opposing resilient arms 60 that can be outwardly biased as the attaching member 54 is moved into the attached position 52 to partially encircle the cable housing 24. Once the clip assembly 36 is in the attached position 52, the resilient arms 60 of the attaching member 54 at least partially encircle the cable housing 24 and hold the clip assembly 36 in place. In order to cause the outwardly biasing movement of the resilient arms 60, the resilient arms 60 can include flared outer portions 62 that can engage the outside surface 64 of the cable housing 24. These flared outer portions 62 cause the resilient arms 60 to be biased outward so that the resilient arms 60 can move around the cable housing 24 and then substantially return to their original shape when the resilient arms 60 and the clip assembly 36 are in the attached position 52.

As exemplified in FIGS. 5-8, the frame portion 56 of the clip assembly 36 can include an elastomeric cap 70 that is positioned within the frame portion 56. In this configuration, the elastomeric cap 70 slidably engages the actuator cable 22. As exemplified in FIGS. 7 and 8, the frame portion 56 defines an outer rim 72 that holds the elastomeric cap 70 in place. The elastomeric cap 70 includes a slot 74 that slidably engages the actuator cable 22 during operation of the actuator 20 and also upon placement of the clip assembly 36 into the attached position 52.

Referring again to FIGS. 5-8, the clip assembly 36 is sized such that the resilient arms 60 of the attaching member 54 engage the cable housing 24 at a particular position. To ensure proper placement of the attaching member 54, the clip assembly 36 can include a locating protrusion 80 (shown in FIG. 6) that engages a recess 82 (shown in FIGS. 7 and 8) of the cable bracket 30. The recess 82 of the cable bracket 30 typically receives the cable housing 24 and secures the cable housing 24 in the secured position 34. This recess 82 also receives the locating protrusion 80 of the clip assembly 36 to ensure proper placement of the clip assembly 36 with respect to the cable housing 24 along a longitudinal axis 84 of the cable housing 24. The locating protrusion 80 and the resilient arms 60 cooperate with a seat member 90 that is also defined within the clip assembly 36. The seat member 90 engages an opposing second side 40 of the cable bracket 30 opposite from the resilient arms 60, which engage the first side 38. In this manner, the resilient arms 60 and the seat member 90 engage the opposing first and second sides 38, 40 of the cable bracket 30 to locate the clip assembly 36 on the cable housing 24. The locating protrusion 80 provides positive feedback to an installer of the clip assembly 36 for ensuring that the clip assembly 36 is properly inserted into the attached position 52. When in the attached position 52, the elastomeric cap 70 of the frame portion 56 is aligned with the end 92 of the cable housing 24. In this manner, the elastomeric cap 70 defines a cover 94 for the end 92 of the cable housing 24 that is configured to prevent infiltration of foreign material into the cable housing 24 via movement of the actuator cable 22. In addition to locating the clip assembly 36 with respect to the cable bracket 30, the seat member 90 also engages the cable housing 24 proximate the end 92 of the cable housing 24. Through this engagement, the seat member 90 serves to seat the frame member 32 and the elastomeric cap 70 at the end 92 of the cable housing 24 for proper alignment with the actuator cable 22.

Figure 5:
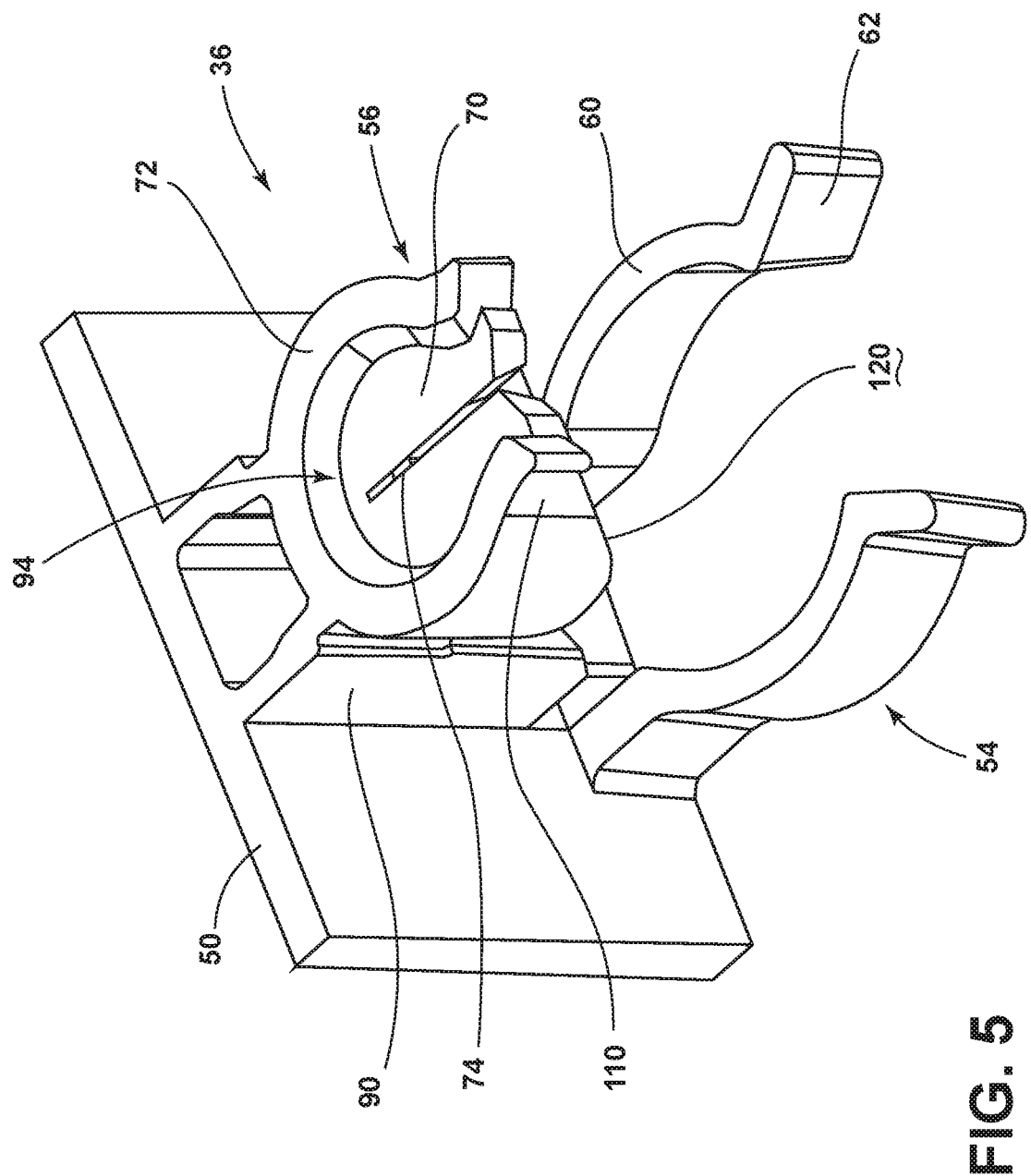
FIG. 5 is a side perspective view of the clip assembly.
Figure 6:
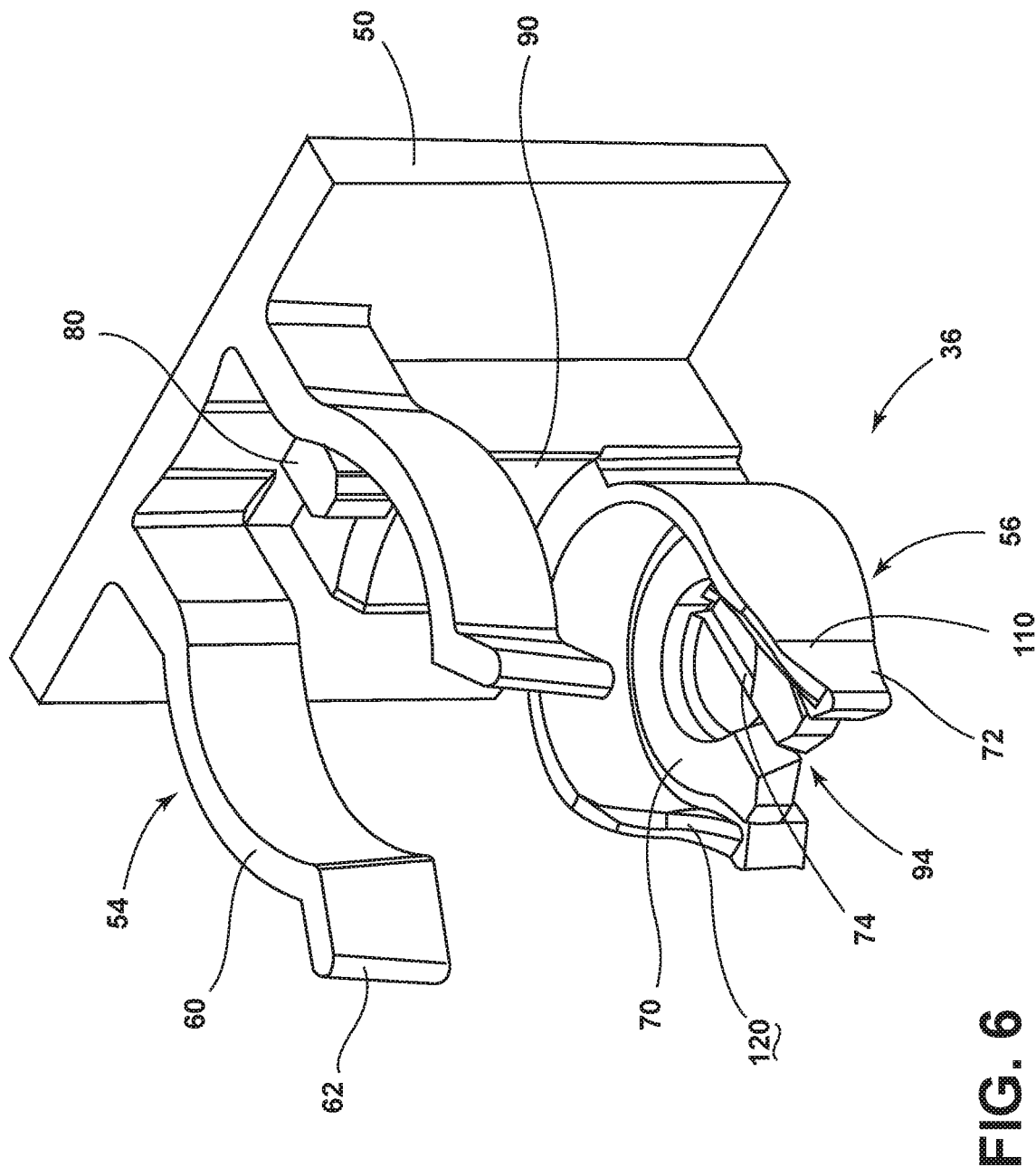
FIG. 6 is an alternate perspective view of the clip assembly of FIG. 5.
Figure 7:
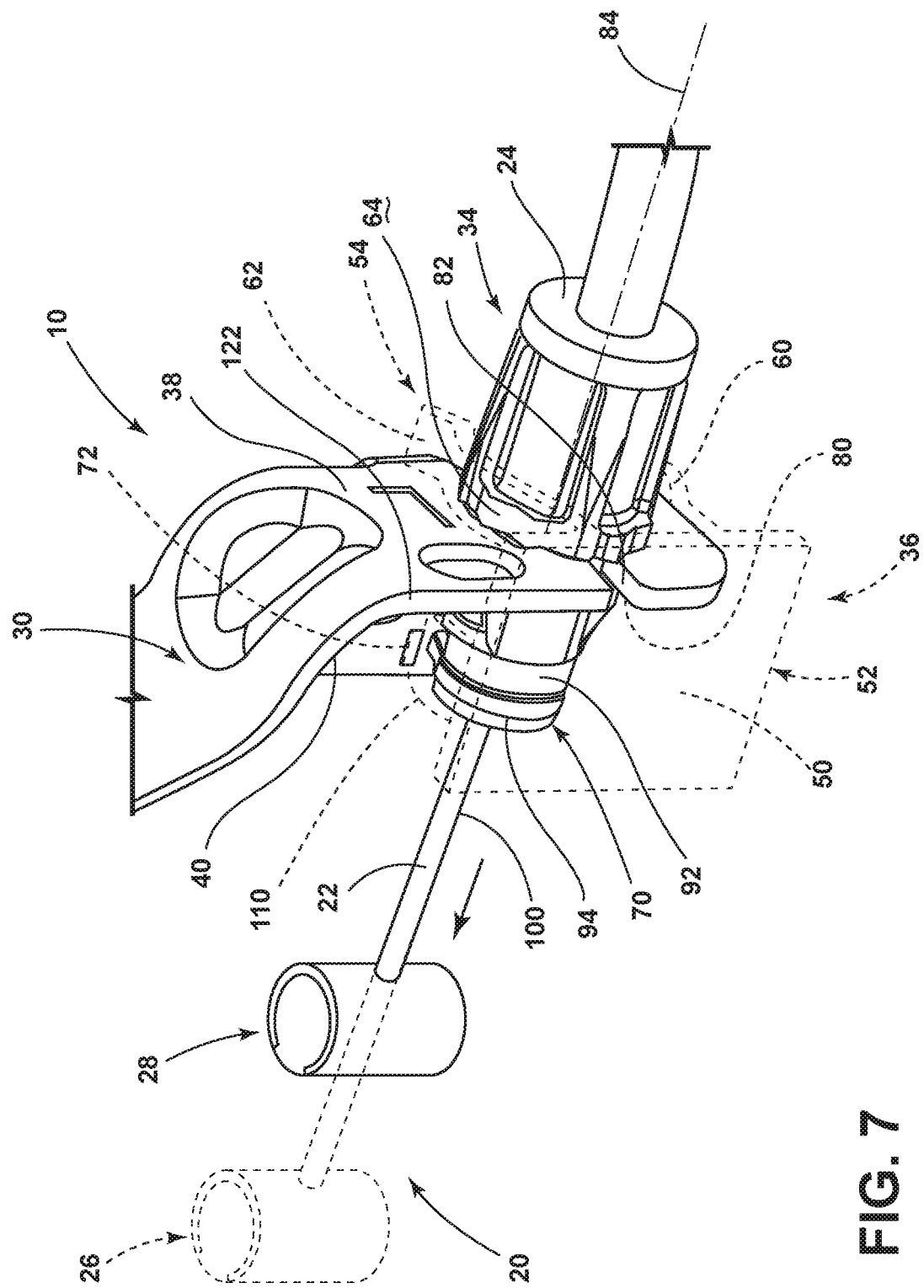
FIG. 7 is a perspective view of a portion of the actuator assembly and showing orientation of the clip assembly with the actuator assembly.
Figure 8:
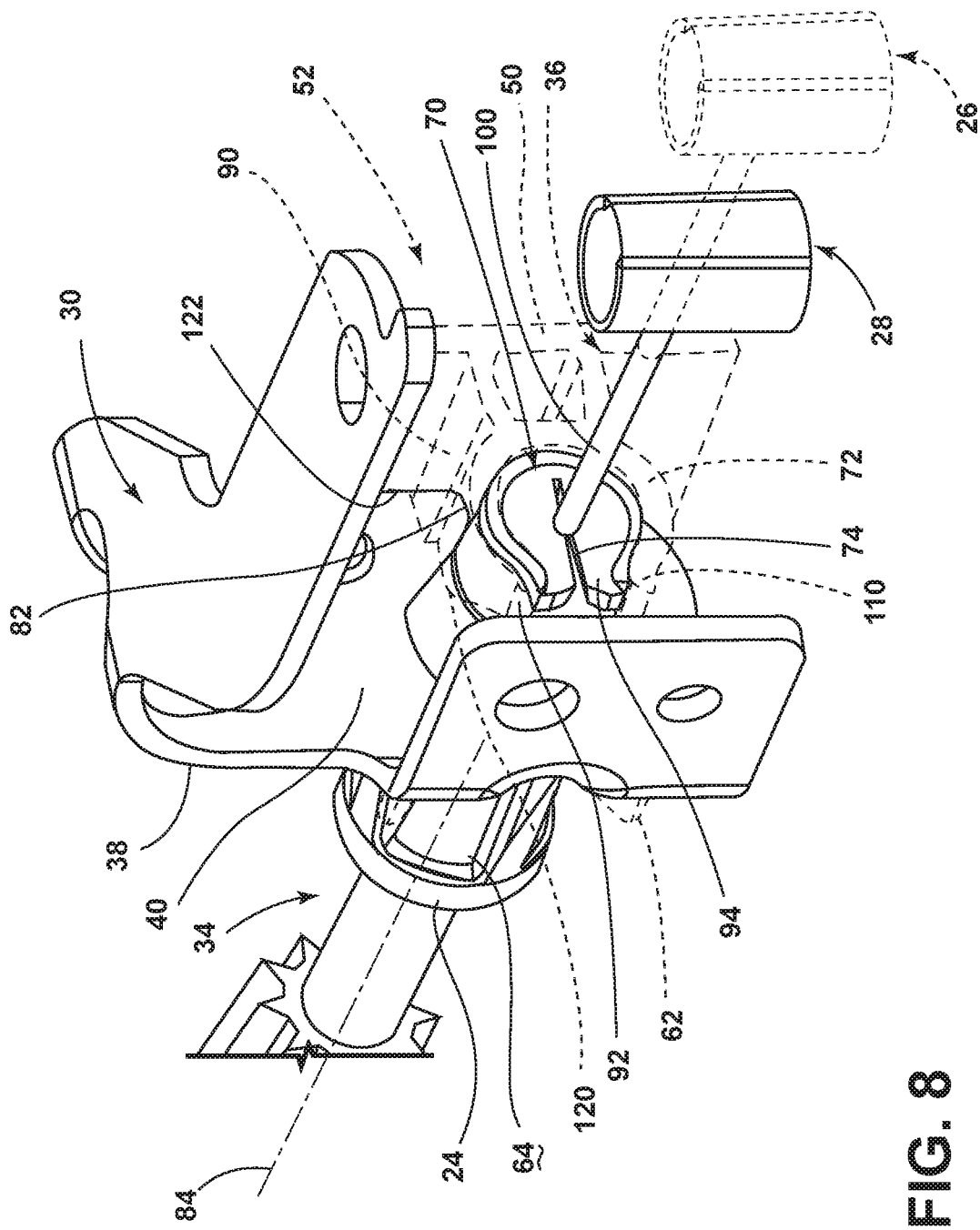
FIG. 8 is an alternate perspective view of the actuator assembly of FIG. 7.
Figure 9:
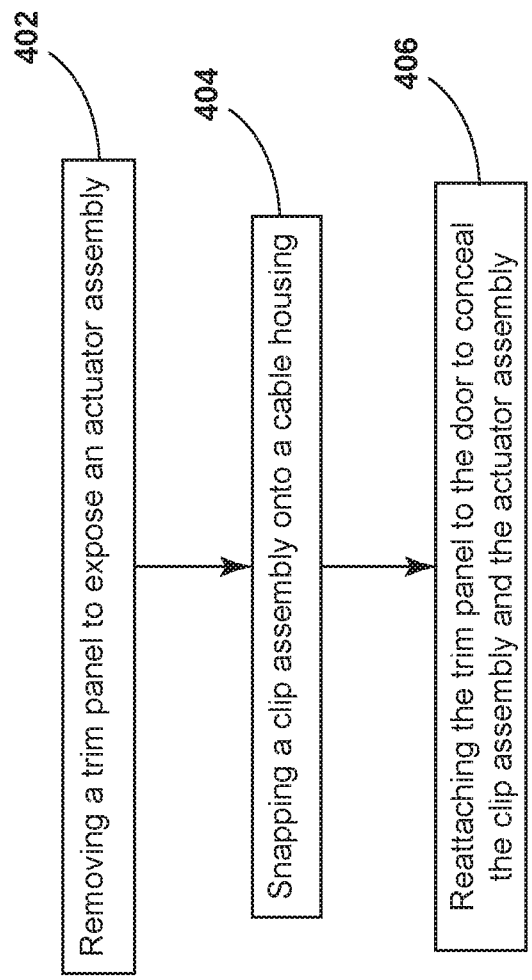
FIG. 9 is a linear flow diagram illustrating a method for installing a clip assembly onto an actuator assembly for a vehicle door.

As exemplified in FIGS. 5 and 6, the seat member 90 and the frame portion 56 can be incorporated within a single structure. It is also contemplated that the frame member 32 can extend from a portion of the seat member 90. Through this configuration, the frame portion 56 can be offset from the body portion 50 to properly align with the end 92 of the cable housing 24, while the resilient arms 60 of the attaching member 54 are also positioned to encircle a wider portion of the cable housing 24.

Referring again to FIGS. 1-8, the actuator assembly 10 for the door 12 of the vehicle 14 can include the actuator 20 that is operably engaged with the actuator cable 22. The cable housing 24 receives the actuator cable 22 and the cable bracket 30 secures the cable housing 24 in a secured position 34. The clip assembly 36 attaches to the cable housing 24 and also slidably engages the actuator cable 22 upon operation of the actuator 20. As discussed above, the slidable engagement between the clip assembly 36 and the actuator cable 22 also occurs during installation of the clip assembly 36 onto the cable housing 24 and the actuator cable 22. The clip assembly 36 is attached to the cable housing 24 proximate a first side 38 of the cable bracket 30. The clip assembly 36 also slidably engages the actuator cable 22 proximate a second side 40 of the cable bracket 30. As discussed above, to properly locate the clip assembly 36 with respect to the cable bracket 30, the cable housing 24 and the actuator cable 22, the clip assembly 36 typically engages the opposing surfaces at the first and second sides 38, 40 of the cable bracket 30.

Referring again to FIGS. 1-8, during operation of the actuator 20 and the actuator cable 22, the actuator cable 22 extends from and retracts into the cable housing 24 between the extended and retracted positions 26, 28 (exemplified in FIGS. 7 and 8). As discussed above, movement of the actuator cable 22 between the extended and retracted positions 26, 28 serves to operate the latching mechanism 16 for operating various components of the door 12 for the vehicle 14. The clip assembly 36 attaches to the end 92 of the cable housing 24 and serves as a water protector or cover 94 that can be attached to the end 92 of the cable housing 24 to slidably engage the actuator cable 22. When the actuator cable 22 is moved to the extended position 26, portions of the actuator cable 22 are exposed to areas outside of the cable housing 24 for a temporary period of time. During this period of exposure, debris, fluid and other foreign materials can be deposited upon the actuator cable 22. When the actuator cable 22 is moved back to the retracted position 28, the temporarily exposed portion 100 of the actuator cable 22 slides through the slot 74 defined within the elastomeric cap 70. This slidable engagement causes the elastomeric cap 70 to push off or push away any foreign material before it has an opportunity enter into the cable housing 24. Similarly, any lubricant that is disposed within the cable housing 24 can be at least partially contained within the cable housing 24 through the slidable engagement of the elastomeric cap 70 at the end 92 of the cable housing 24. As the actuator cable 22 moves from the retracted position 28 to the extended position 26, any lubricant contained within the cable housing 24 and around the actuator cable 22 can be at least partially contained within the cable housing 24. Through this configuration, debris, fluid, contaminants, and other foreign material can be prevented from entering into the cable housing 24 through operation of the elastomeric cap 70.

Referring again to FIGS. 3-8, the resilient arms 60 of the clip assembly 36 serve to provide a snapping engagement between the clip assembly 36 and the cable housing 24. This snapping engagement can be conveniently engaged as an after-market component during a service call. This component can also be conveniently installed during an assembly process within an assembly line for manufacturing the vehicle 14 or components of the vehicle 14. Accordingly, the clip assembly 36 disclosed herein can be incorporated within newly manufactured or after-market vehicle 14.

Referring again to FIGS. 5-8, the frame portion 56 of the clip assembly 36 can include secondary resilient members 110 that can be used for clipping onto the end 92 of the cable housing 24. In such a configuration, the secondary resilient members 110 of the frame member 32 provide a supplemental engagement between the clip assembly 36 and the cable housing 24. In addition, the secondary resilient members 110 of the frame member 32 also serve to locate the elastomeric cap 70 at the end 92 of the cable housing 24 and define a close engagement between the elastomeric cap 70 and the end 92 of the cable housing 24. As with the resilient arms 60 of the attaching member 54, the secondary resilient members 110 of the frame portion 56 can at least partially encircle the end 92 of the cable housing 24 to further secure the clip assembly 36 to the cable housing 24 and the cable bracket 30.

Referring again to FIGS. 1-8, the actuator assembly 10 that is installed within the door 12 of the vehicle 14 can include the actuator 20 for operating the latching mechanism 16. The actuator cable 22 is slidable within the cable housing 24 and extends between the actuator 20 and the latching mechanism 16. The cable bracket 30 secures the cable housing 24 to the frame member 32 for the door 12 of the vehicle 14 to define a secured position 34 of the cable housing 24. The clip assembly 36 attaches to the cable housing 24 and slidably engages the actuator cable 22. As discussed above, the clip assembly 36 can include the body portion 50 that engages the cable bracket 30. The clip assembly 36 can also include the resilient attaching member 54 that encircles at least a portion of the cable housing 24. The elastomeric cap 70 is also included within the clip assembly 36 for selectively and slidably engaging the actuator cable 22. The resilient attaching member 54 and the elastomeric cap 70 each extend from the body portion 50 to engage the cable housing 24 and the actuator cable 22. Typically, when the clip assembly 36 is formed, two separate materials will be used to create the elastomeric cap 70 and the remainder of the clip assembly 36.

According to various aspects of the device, the elastomeric cap 70 can be made of various elastic materials that can include, but are not limited to, santoprene, silicone, rubber, ethylene propylene, diene, terpolymer (EPDM), thermoplastic vulcanizates (TPV) or other thermoplastic elastomers (TPE) and other similar elastic-type materials. Other portions of the clip assembly 36 can include more resilient materials that can include, but are not limited to, glass-filled polypropylene, polyoxymethylene (POM), composite materials, various polymers, and other similar materials having resilient-type polymers. Various molding processes can be used to form these materials into the clip assembly 36. Typically, a two-part injection molding process will be used to separately form the elastomeric cap 70 and the remainder of the clip assembly 36.

Referring now to FIGS. 1-9, having described various aspects of the clip assembly 36 used in connection with the actuator assembly 10, a method 400 is disclosed for attaching a clip assembly 36 to an actuator assembly 10 in an after-market vehicle 14. According to the method 400, a step 402 includes removing a trim panel 124 of the door 12 of the vehicle 14 to offer access to the actuator assembly 10. The method 400 also includes a step 404 of snapping the clip assembly 36 onto the cable housing 24. As discussed above, the snapping engagement between the resilient attaching member 54 of the clip assembly 36 results in a simultaneous sliding engagement between the elastomeric cap 70 and the actuator cable 22. Again, proper installation of the clip assembly 36 into the installed position results in this proper sliding engagement between the elastomeric cap 70 and the actuator cable 22. To ensure this proper installation into the installed position, the clip assembly 36 includes the locating protrusion 80 that engages a recess 82 of the cable bracket 30. The resilient attaching member 54 and the seat member 90 also engage the cable bracket 30 and engage opposing first and second sides 38, 40 of the cable bracket 30 to further define the installed position. A step 406 of the method 400 includes returning the trim panel 124 to the door 12 to conceal the clip assembly 36 and the actuator assembly 10.

Referring again to FIGS. 1-8, it is contemplated that when the clip assembly 36 is to be placed into the installed position, improper alignment of the clip assembly 36 will typically not result in the clipping engagement between the resilient attaching member 54 and the cable bracket 30. To guide the cable bracket 30 into proper alignment with respect to the clip assembly 36, the resilient attaching member 54 or the frame member 32 that includes the elastomeric cap 70 can include an angled guide surface 120 that can engage an edge 122 of the cable bracket 30. This angled guide surface 120 can cooperate with the edge 122 of the cable bracket 30 to guide the clip assembly 36 into the attached position 52. Accordingly, an installer or assembler of the actuator assembly 10 is able to position the clip assembly 36 within a range of positions, any one of which can result in the clip assembly 36 being guided into the installed position through the various guiding features and surfaces of the clip assembly 36. Again, these surfaces work in combination with the cable bracket 30, the cable housing 24 and the actuator cable 22 to define the attached position 52 of the clip assembly 36.

According to various aspects of the device, the clip assembly 36 can be used in connection with various actuators 20 used within a vehicle 14. These actuators 20 can be used for various components of the vehicle 14 such as door 12 latches, release mechanisms, switches, storage compartments, and other similar locations within a vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An actuator assembly for a vehicle door, the actuator assembly comprising:
    an actuator operably engaged with an actuator cable;
    a cable housing that receives the actuator cable, wherein a cable bracket secures the cable housing in a secured position;
    a clip assembly that attaches to the cable housing and the cable bracket, wherein the clip assembly also slidably engages the actuator cable upon operation of the actuator, wherein the clip assembly selectively attaches to the cable housing, the actuator cable and the cable bracket in a direction perpendicular to a longitudinal axis of the cable housing, and wherein the clip assembly includes opposing resilient arms having an opening therebetween and that extends partially around the cable housing to partially encircle a portion of the cable housing; and
    wherein the clip assembly includes a frame portion, the opposing resilient arms and the frame portion each extending perpendicularly from a body portion, wherein the frame portion includes and elastomeric cap therein that slidably engages the actuator cable, the elastomeric cap including a slot that aligns with an opening between the opposing resilient arms and slidably engaging the actuator cable during operation of the actuator and upon placement of the clip assembly in an attached position of the clip assembly.

2. The actuator assembly of claim 1, wherein the clip assembly attaches to the cable housing proximate a first side of the cable bracket and slidably engages the actuator cable proximate a second side of the cable bracket.

3. The actuator assembly of claim 1, wherein the clip assembly includes an attaching member that extends outward from the body portion, the attaching member selectively attaching to the cable housing proximate a first side of the cable bracket.

4. The actuator assembly of claim 3, wherein the attaching member includes the opposing resilient arms that extend outward from the body portion and partially encircle the cable housing.

5. The actuator assembly of claim 1, wherein the clip assembly includes the frame portion and the elastomeric cap positioned within the frame portion, the frame portion selectively engaging the actuator cable proximate a second side of the cable bracket.

6. The actuator assembly of claim 5, wherein the frame portion in the attached position engages an end of the cable housing.

7. The actuator assembly of claim 6, wherein the body portion includes a seat member that engages with the cable housing proximate the end of the cable housing to seat the frame portion and the elastomeric cap at the end of the cable housing.

8. The actuator assembly of claim 7, wherein the elastomeric cap defines a cover for the end of the cable housing that is configured to prevent infiltration of foreign material into the cable housing via the actuator cable.

9. A vehicle door comprising:
an actuator for operating a latching mechanism;
an actuator cable extending between the actuator and the latching mechanism;
a cable housing that slidably receives the actuator cable, wherein the actuator cable is operable within the cable housing between extended and retracted positions;
a cable bracket that secures the cable housing to a frame member in a secured position; and
a clip assembly that attaches to and extends partially around the cable housing and slidably engages the actuator cable upon operation of the actuator, wherein the clip assembly engages the cable housing at a first side of the cable bracket and engages the actuator cable at a second side of the cable bracket, wherein the clip assembly is attached to the cable housing and the actuator cable in a direction perpendicular to a longitudinal axis of the cable housing, wherein the clip assembly includes a planar body portion that is configured to engage the cable bracket to define an attached position, wherein the clip assembly includes an attaching member and a frame portion that each extend perpendicularly from the planar body portion, the attaching member selectively attaching to the cable housing and the frame portion selectively engaging the actuator cable, wherein the attaching member includes opposing resilient arms having an opening therebetween and that partially encircle the cable housing and flared outer portions that are configured to receive an outside surface of the cable housing when the clip assembly attaches to the cable housing, wherein the frame portion includes an elastomeric cap positioned within the frame portion that slidably engages the actuator cable, and wherein the elastomeric cap includes a slot that aligns with the opening between the opposing resilient arms and slidably engages the actuator cable during operation of the actuator and upon placement of the clip assembly in the attached position.

10. The vehicle door of claim 9, wherein the planar body portion includes a seat member that engages with the cable housing proximate an end of the cable housing to seat that frame portion and the elastomeric cap at the end of the cable housing.

11. The vehicle door of claim 10, wherein the elastomeric cap defines a cover for the end of the cable housing that is configured to prevent infiltration of foreign material into the cable housing via the actuator cable.

12. An actuator assembly for a vehicle door, the actuator assembly comprising:
an actuator for operating a latching mechanism;
an actuator cable slidable within a cable housing and extending between the actuator and the latching mechanism;
a cable bracket having a recess that receives the cable housing and that secures the cable housing to a frame member in a secured position; and
a clip assembly that attaches to the cable housing and the recess of the cable bracket and slidably engages the actuator, the clip assembly comprising:
a planar body portion that engages the cable bracket;
a resilient attaching member having opposing resilient arms with an opening therebetween, the opposing resilient arms extending partially around the cable housing to encircle only a portion of the cable housing; and
an elastomeric cap having a cover that defines a slot that is aligned with the opening defined between the opposing resilient arms, wherein the slot of the cover selectively and slidably engages the actuator cable, wherein the resilient attaching member and the elastomeric cap extend from a central area of the planar body portion, and wherein the planar body portion is positioned to one side of the cable bracket and the frame member.

13. The actuator assembly of claim 12, wherein the clip assembly includes:
a seat member that extends from the planar body portion and engages with the cable housing proximate an end of the cable housing to seat a frame portion of the clip assembly and the elastomeric cap at the end of the cable housing, wherein the elastomeric cap defines the cover for the end of the cable housing that is configured to prevent infiltration of foreign material into the cable housing via the actuator cable.

* * * * *